(12) United States Patent
Huang

(10) Patent No.: US 12,722,729 B2
(45) Date of Patent: Sep. 1, 2026

(54) BACKPACK AND BACKPACK CONNECTING COMPONENTS

(71) Applicant: Jianming Huang, Guangzhou (CN)

(72) Inventor: Jianming Huang, Guangzhou (CN)

( * ) Notice: Subject to any disclaimer, the term of this patent is extended or adjusted under 35 U.S.C. 154(b) by 0 days.

(21) Appl. No.: 18/600,888

(22) Filed: Mar. 11, 2024

(65) Prior Publication Data

US 2025/0282435 A1 Sep. 11, 2025

(51) Int. Cl.

*B62J 9/27* (2020.01)
*A45F 3/04* (2006.01)
*B62J 9/26* (2020.01)

(52) U.S. Cl.

CPC .................................... *B62J 9/27* (2020.02); *A45F 3/04* (2013.01); *B62J 9/26* (2020.02)

(58) Field of Classification Search

CPC .................. B62J 9/27; B62J 9/26; B62J 9/14
USPC ................................................ 224/413, 447
See application file for complete search history.

(56) References Cited

U.S. PATENT DOCUMENTS 4,059,207 A * 11/1977 Jackson ................ A45C 13/00 224/463
4,359,233 A * 11/1982 Jackson .................... B62J 9/25 224/463
4,566,617 A * 1/1986 Jackson .................... B62J 9/26 224/427
4,580,706 A * 4/1986 Jackson .................... B62J 9/23 224/438
4,643,343 A * 2/1987 Goldman .................. B62J 9/26 224/427
5,190,345 A * 3/1993 Lin .......................... B62J 9/26 224/427
D339,095 S * 9/1993 Anderson .................... D12/409
5,460,303 A * 10/1995 Downs ...................... B62J 9/26 224/430
5,655,694 A * 8/1997 Keckeisen ................ B62J 9/26 224/430
6,029,875 A * 2/2000 Johnston ................... B62J 7/04 224/584
6,305,590 B1 * 10/2001 Hayes ....................... B62J 9/25 190/110
7,225,956 B2 * 6/2007 Lien .......................... B62J 9/26 224/427
7,614,535 B2 * 11/2009 Hubbe ...................... B62J 9/26 224/457

(Continued)

*Primary Examiner* — Nathan J Newhouse
*Assistant Examiner* — Lester L Vanterpool
(74) *Attorney, Agent, or Firm* — Jose Cherson Weissbrot

(57) ABSTRACT

This utility model discloses a backpack and a set of backpack connecting components. The backpack comprises a backpack body, a connecting component A set on the left side of the backpack body, a connecting component B set on the right side of the backpack body, and a connecting component C set on the bottom of the backpack body. Connecting component A is used for detachable connection with the component a set on the left side of the bicycle seat, connecting component B is used for detachable connection with the component b set on the right side of the bicycle seat, and connecting component C is used for detachable connection with the component c set on the bicycle seat post. This backpack can be used as a regular backpack and can also be used with a bicycle equipped with the connecting components for quick disassembly and assembly.

8 Claims, 4 Drawing Sheets

(56) References Cited

U.S. PATENT DOCUMENTS

| | | | | |
|---|---|---|---|---|
| 8,056,784 | B2 * | 11/2011 | Dacko | B62J 9/26 224/427 |
| D658,112 | S * | 4/2012 | Cutino | D12/409 |
| 10,266,222 | B2 * | 4/2019 | McKenzie | B62J 9/26 |
| 10,363,982 | B1 * | 7/2019 | Parsons | B62J 9/26 |
| 10,953,943 | B2 * | 3/2021 | Maguire | F16M 11/105 |
| 11,001,325 | B2 * | 5/2021 | Wilkey | B62J 9/40 |
| 11,884,351 | B2 * | 1/2024 | Seguin | B62H 1/00 |
| 2003/0213825 | A1 * | 11/2003 | Hale | B62J 9/27 224/463 |
| 2009/0289091 | A1 * | 11/2009 | Ulrich | B62J 9/24 224/447 |
| 2010/0006720 | A1 * | 1/2010 | Chien-Ping | B62J 9/27 248/201 |
| 2010/0072238 | A1 * | 3/2010 | Pape | B62J 9/27 224/431 |
| 2012/0187170 | A1 * | 7/2012 | Ho | B62J 9/27 224/441 |
| 2013/0207423 | A1 * | 8/2013 | Russell | B62J 1/20 297/188.2 |
| 2024/0067291 | A1 * | 2/2024 | Low | B62J 27/00 |

* cited by examiner

BACKPACK AND BACKPACK CONNECTING COMPONENTS

TECHNICAL FIELD

This utility model pertains to the field of backpack technology, specifically involving a backpack and a set of backpack connecting components.

BACKGROUND

For carrying loads on bicycles (including manual and electric bicycles) located behind the seat post, existing solutions typically involve installing a rear rack for holding items behind the seat post, which can be paired with bags to facilitate item loading. However, due to issues such as increased weight, impact on aesthetics, and added noise caused by installing a rear rack, it affects the riding experience, leading some cyclists to be reluctant to add a rear rack.

Currently, there is also a type of tail-specific bag that is directly fixed in the space behind the seat post using methods like strapping or brackets. Since this bag is designed for specific use, users don't use it for everyday purposes when not cycling. Therefore, when stopping cycling, items from the specialized bag need to be transferred to a regular backpack. Additionally, these tail-specific bags often adopt a unique shape with a wider top and a narrower bottom to avoid interference with the rider's inner thighs/rear side. However, this design results in low space utilization when loading items.

SUMMARY

In response to the shortcomings of existing technologies, this utility model provides a backpack and a set of backpack connecting components. It can be used as a regular backpack in daily life and can be combined with a bicycle equipped with the connecting component for quick disassembly and assembly. During cycling, it avoids interference with the rider's inner thighs/rear side and enhances the cycling experience. After cycling, it allows for quick disassembly and carrying without the need to transfer items, optimizing the overall cycling experience.

The technical solution of this utility model is as follows: On one hand, it provides a backpack comprising a backpack body, connecting component A set on the left side of the backpack body, connecting component B set on the right side of the backpack body, and connecting component C set on the bottom of the backpack body. Connecting component A is used for detachable connection with the component a set on the left side of the bicycle seat, connecting component B is used for detachable connection with the component b set on the right side of the bicycle seat, and connecting component C is used for detachable connection with the component c set on the bicycle seat post. The connections between connecting component A and component a, connecting component B and component b, and connecting component C and component c collectively constitute the support structure of the backpack body, and the connection between connecting component C and component c creates spacing between the backpack body and the seat post.

Preferably, the bottom of the backpack body is fixed with a base, and the base has a mounting slot with one end open to the outside, facing the seat post. The mounting slot is used to accommodate connecting component C.

Preferably, connecting component C is specifically a sleeve, and connecting component c includes a support rod and a clamping hoop. The clamping hoop tightens around the seat post, one end of the support rod is connected to the clamping hoop, the support rod matches the sleeve, and the support rod can be inserted into the sleeve and locked by a pin.

Preferably, pivot shaft X is set inside the mounting slot near the seat post, and one end of the sleeve can be rotatably sleeved on pivot shaft X. A limiting cam protrusion is set at the far end away from the seat post inside the mounting slot. When the angle between the sleeve and the mounting slot is 0°, the limiting cam protrusion is used to limit the sleeve. When the angle is 180°, at least ⅓ of the length of the sleeve remains inside the mounting slot.

Preferably, the sleeve is fixed in the mounting slot, and one end of the support rod is hinged to the clamping hoop. The support rod can rotate relative to the seat post in the range of 0-90°, and the support rod can be locked at 0° and 90° relative to the seat post.

Preferably, the connections between connecting component A and component a, and connecting component B and component b, can use snap-on, hook-on, or strap connections.

Preferably, the connections between connecting component A and component a, and connecting component B and component b, use snap-on connections. Specifically, connecting component A, connecting component B, component a, and component b all include adjustable straps and buckles. The length of the adjustable straps can be adjusted, and one end of the adjustable strap of connecting component A and connecting component B is connected with the buckles, while the other end is connected to the backpack body. One end of the adjustable strap of component a and component b is connected with the buckles, and the other end is connected to the bicycle seat. The buckles of connecting component A and connecting component b are male, and the buckles of component a and component B are female. The buckles of component a and component b can be docked and fastened.

On the other hand, this utility model provides a set of backpack connecting components, including any one of the backpacks described, and further comprising connecting component a for connection with the left side of the bicycle seat, connecting component b for connection with the right side of the bicycle seat, and connecting component c for connection with the bicycle seat post.

The beneficial effects of this utility model are as follows:

The backpack provided by this utility model achieves quick disassembly and assembly with a bicycle through the detachable connections between connecting component A and component a, connecting component B and component b, and connecting component C and component c. The backpack can be securely fixed on the bicycle through these three points during cycling, eliminating the need for the rider to carry the backpack on his/her back, making cycling more comfortable. After reaching the destination, the backpack can be quickly separated from the bicycle, and the rider does not need to transfer items from any specialized bicycle bag, allowing for quick disassembly and carrying, facilitating the rider to carry the backpack for other activities when not cycling.

After assembly with a bicycle, the bottom of the backpack and the seat post maintain sufficient distance, preventing interference with the rider's movements and ensuring a comfortable and safe cycling experience.

The backpack provided by this utility model, through the rotatable and foldable design of the sleeve, allows the sleeve to be folded and stored in the mounting slot on the base when the backpack separated from the bicycle, without affecting the daily use of the backpack. Alternatively, through the rotatable and foldable design of the support rod, the presence of the support rod can be further reduced when the backpack is separated from the bicycle.

BRIEF DESCRIPTION OF DRAWINGS

For a clearer understanding of specific embodiments of this utility model or the technical solutions in the prior art, brief introductions to the accompanying drawings used in specific embodiments or descriptions of the prior art that are needed are provided below. In all the drawings, similar elements or parts are generally labeled with similar reference symbols. In the drawings, the proportions of various elements or parts may not necessarily be drawn to scale.

Figure 1:
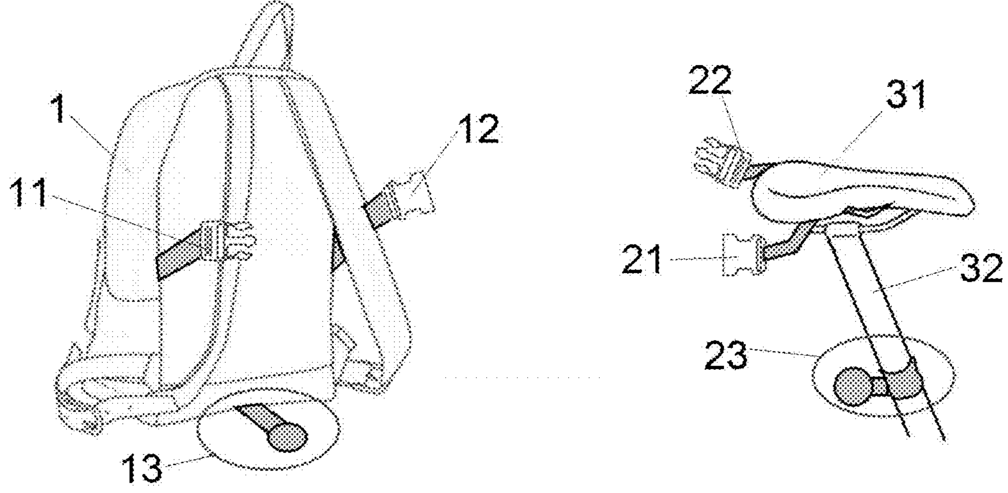
FIG. 1 is a schematic diagram of the structure of the backpack and backpack connecting components provided by Example 1 of this utility model.

In the drawings, 1—backpack body, 11—connecting component A, 12—connecting component B, 13—connecting component C, 131—sleeve, 14—base, 141—mounting slot, 21—connecting component a, 22—connecting component b, 23—connecting component c, 231—clamping hoop, 232—support rod, 31—bicycle seat, 32—seat post.

DESCRIPTION OF EMBODIMENTS

In order to facilitate a better understanding of the proposed solution by those skilled in the art, the following detailed and comprehensive description of the technical solutions in the embodiments of this application will be provided in conjunction with the accompanying drawings. It is apparent that the described embodiments are only part of the embodiments of this application, not all embodiments. Based on the embodiments described in this application, all other embodiments obtained by those skilled in the art without engaging in creative work, should fall within the scope of protection of this application.

It should be noted that the terms "first," "second," etc., used in the specification and claims, and the like in the accompanying drawings, are used to distinguish similar objects, and do not necessarily indicate a particular sequence or order. These terms are used interchangeably in appropriate circumstances so that the embodiments described here are understood.

In this application, the terms "up," "down," "inner," etc., indicating spatial or positional relationships are based on the orientation or position shown in the drawings. These terms are mainly used to better describe the embodiments of this application and are not used to limit the devices, components, or parts indicated to a specific orientation, or to construct and operate in a specific orientation.

Furthermore, the terms "set," "provided with," "connected," "fixed," etc., should be broadly interpreted. For example, "connected" can be a fixed connection, a detachable connection, or an integral structure; it can be a mechanical connection or an electrical connection; it can be directly connected, or indirectly connected through an intermediate medium, or internally connected between two devices, components, or parts. For those skilled in the art, these terms can be understood in specific contexts.

In addition, the meaning of the term "multiple" should be understood as two or more.

It should be noted that, in the absence of conflict, the embodiments in this application and the features in the embodiments can be combined with each other. The following will detail the embodiments of this application with reference to the drawings.

Example 1

This embodiment provides a backpack, as shown in FIG. 1, including a backpack body 1, connecting component A11 set on the left side of the backpack body 1, connecting component B12 set on the right side of the backpack body 1, and connecting component C13 set on the bottom of the backpack body 1. Connecting component A11 is used for detachable connection with the component a21 set on the left side of the bicycle seat 31, connecting component B12 is used for detachable connection with the component b22 set on the right side of the bicycle seat 31, and connecting component C13 is used for detachable connection with the component c23 set on the bicycle seat post 32. The connections between connecting component A11 and component a21, connecting component B12 and component b22, and connecting component C13 and component c23 collectively constitute the support structure of the backpack body 1, and the connection between connecting component C13 and component c23 creates spacing between the backpack body 1 and the seat post 32.

This design can first firmly fix the backpack on the bicycle during cycling without the need for the rider to carry it on his/her back, making cycling more comfortable. Secondly, there is enough space between the backpack and the seat post 32 to prevent interference with the rider's movements. Finally, after reaching the cycling destination, the backpack can be quickly separated from the bicycle, allowing for convenient carrying.

It should be noted that, when the backpack is assembled with the bicycle, the main force is borne by the connecting components on the left and right sides (the connection between connecting component A11 and connecting component a21, and the connection between connecting component B12 and connecting component b22). The purpose of the bottom connecting components (the connection between connecting component C13 and connecting component c23) are to create spacing between the backpack body 1 and the seat post 32 to prevent interference with the rider's inner thighs/rear side and to limit excessive left and right swaying and rotation of the backpack during cycling, improving stability. Additionally, the bottom connecting component can provide auxiliary support during the assembly and disassembly of the backpack.

Figure 2:
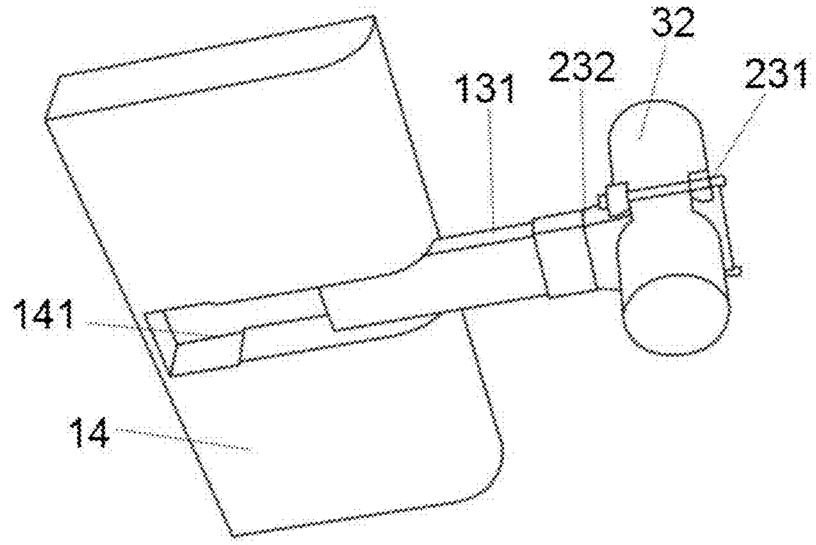
FIG. 2 is a schematic diagram of the structure of the base of the backpack provided by Example 1 of this utility model.

In this embodiment, to provide a stable and reliable mounting position for connecting component C13, the bottom of the backpack body 1 is fixed with a base 14, as shown in FIG. 2. The base 14 is preferably made of plastic, and it has a mounting slot 141. The mounting slot 141 is open to the outside at one end facing the seat post 32 and is used to accommodate connecting component C13. The setting of the base 14 also ensures that the backpack body 1 can stand upright on a flat surface even when the backpack separated from the bicycle, making it less prone to tipping. To enhance the aesthetics of the backpack, the outer surface of the base 14 can be covered with fabric.

In this embodiment, as shown in FIG. 2, connecting component C13 specifically is a sleeve 131, and connecting component c23 specifically includes a support rod 232 and a clamping hoop 231. The clamping hoop 231 tightens around the seat post 32, one end of the support rod 232 is connected to the clamping hoop 231, and the support rod 232 matches the sleeve 131. The support rod 232 can be inserted into the sleeve 131 and locked by a pin.

In summary, the connection between connecting component C13 and connecting component c23 is achieved by inserting the support rod 232 into the sleeve 131 and locking it with a pin. Connecting component C13 and connecting component c23 are preferably made of aluminum alloy. The sleeve 131 has a rounded rectangular cross-section, as shown in FIG. 2, and the cross-sectional shape and size of the support rod 232 are precisely matched to the sleeve 131. This design provides better strength and rigidity, increases the load-bearing capacity of the sleeve 131, prevents left and right swaying or rotation of the backpack during cycling, optimizes stability, and the rounded design reduces stress concentration in the sleeve 131 during use, improving durability and service life.

It should be noted that the connection between connecting component C13 and connecting component c23 includes but is not limited to sleeve docking or buckle docking. In some other embodiments, a threaded connection can replace pin locking between sleeve 131 and support rod 232, where a bearing rotational connection between support rod 232 and clamping hoop 231 can achieve the same effect. In some other embodiments, the positions of sleeve 131 and support rod 232 can be swapped, i.e., connecting component C13 specifically becomes support rod 232, while connecting component c23 specifically includes sleeve 131 and clamping hoop 231, achieving the same effect.

Furthermore, near the position of seat post 32 inside mounting slot 141, pivot shaft X is installed in this embodiment. One end of sleeve 131 is rotatably fitted on pivot shaft X, and a limiting card protrusion is set inside mounting slot 141 at the far end away from seat post 32. When the angle between sleeve 131 and mounting slot 141 is 0°, the limiting card protrusion is used to limit sleeve 131. When the angle between sleeve 131 and mounting slot 141 is 180°, at least ⅓ of the length of sleeve 131 remains inside mounting slot 141.

In this embodiment, sleeve 131 adopts a design that can be rotated or say folded. After this design, when the backpack is separated from the bicycle for use, sleeve 131 is completely housed in mounting slot 141 of base 14 without exposure, and the angle between sleeve 131 and mounting slot 141 is 0°, with the limiting card protrusion limiting sleeve 131. When it is necessary to use the bicycle to carry the backpack, the user can manually rotate sleeve 131 to overcome the restriction of the limiting card protrusion, continue rotating until the angle between sleeve 131 and mounting slot 141 is 180°. At this point, it can align with support rod 232 for insertion, and subsequently, the connection between them can be locked by a pin. Additionally, as sleeve 131 still has at least ⅓ of its length inside mounting slot 141 at this time, leverage can be utilized to enhance the stability and load-bearing capacity of the connection. The connections between connecting component A11 and connecting component a21, as well as connecting component B12 and connecting component b22, can serve as auxiliary fixation for the backpack. After reaching the cycling destination, the connections between connecting component A11 and connecting component a21, connecting component B12 and connecting component b22, and connecting component C13 and connecting component c23 are released. Then, sleeve 131 is rotated to reset to an angle of 0 with mounting slot 141, and the backpack can be carried on shoulder.

It should be noted that, in this embodiment, connecting component C13 is specifically a straight sleeve 131. In some other embodiments, connecting component C13 can also adopt a structure of an isosceles triangle plate+straight sleeve 131. That is, the straight sleeve 131 is embedded on the perpendicular bisector of the isosceles triangle plate, and the base of the isosceles triangle plate is hinged with mounting slot 141, achieving the effect of triangular support.

It should be noted that, in this embodiment, connecting component C13 achieves the function of being exposed or concealed through rotatable design. In some other embodiments, the connecting component C13 can also achieves the same function through extension and retraction design. Specifically, the mounting slot may be designed to be enclosed on all sides with only the front end open, allowing the connecting component C13 to slide within the mounting slot. In this manner, the connecting component C13 can extend from or retract into the mounting slot.

It should be noted that, in this embodiment, the specific form of the backpack body includes but is not limited to a backpack with double shoulder straps, a single-shoulder backpack, and a diagonal crossbody backpack.

In this embodiment, the connection methods between connecting component A11 and connecting component a21, as well as connecting component B12 and connecting component b22, include but are not limited to buckle docking, hook docking, or strapping connection.

More specifically, as shown in FIG. 1, the connecting component A11, connecting component B12, connecting component a21, and connecting component b22 of this embodiment all include adjustable straps and buckles. The length of the adjustable strap can be adjusted, and one end of the adjustable strap of connecting component A11 and the adjustable strap of connecting component B12 are both connected to the buckle. The other end is connected to the backpack body 1. The adjustable strap of connecting component a21 and the adjustable strap of connecting component b22 are both connected to the buckle, and the other end is connected to the bicycle seat 31. The buckles of connecting component A11 and connecting component b22 are male buckles, and the buckles of connecting component a21 and connecting component B12 are female buckles. The buckles of connecting component a21 and connecting component b22 can be docked and engaged.

It should be noted that, after the user docks the buckles of connecting component A11 with the buckles of connecting component a21, and the buckles of connecting component B12 with the buckles of connecting component b22, it is necessary to ensure that the adjustable straps of each connecting component are in a tightened state. This ensures that the main force of the backpack falls on the connecting components on the left and right sides, reducing damage to the bottom connecting components and extending the service life of the connecting components.

With this design, not only can the connections between connecting component A11 and connecting component a21, as well as connecting component B12 and connecting component b22, achieve quick installation and removal, but also the connections between connecting component a21 and connecting component b22 can be engaged when the backpack is not mounted. This avoids excessive swinging and movement of connecting component a21 and connecting component b22 with the bicycle body when the backpack is not in use, preventing interference with cycling.

This embodiment also provides a set of backpack connecting components, as shown in FIG. 1, including the backpack described above and also including connecting component a21 for connection with the left side of the bicycle seat 31, connecting component b22 for connection with the right side of the bicycle seat 31, and connecting component c23 for connection with the bicycle seat post 32. Connecting component a21, connecting component b22, and connecting component c23 are all fixedly connected to the bicycle, and more preferably, they use detachable fixed connections for easy replacement in case of local faults or damage.

Example 2

Figure 3:
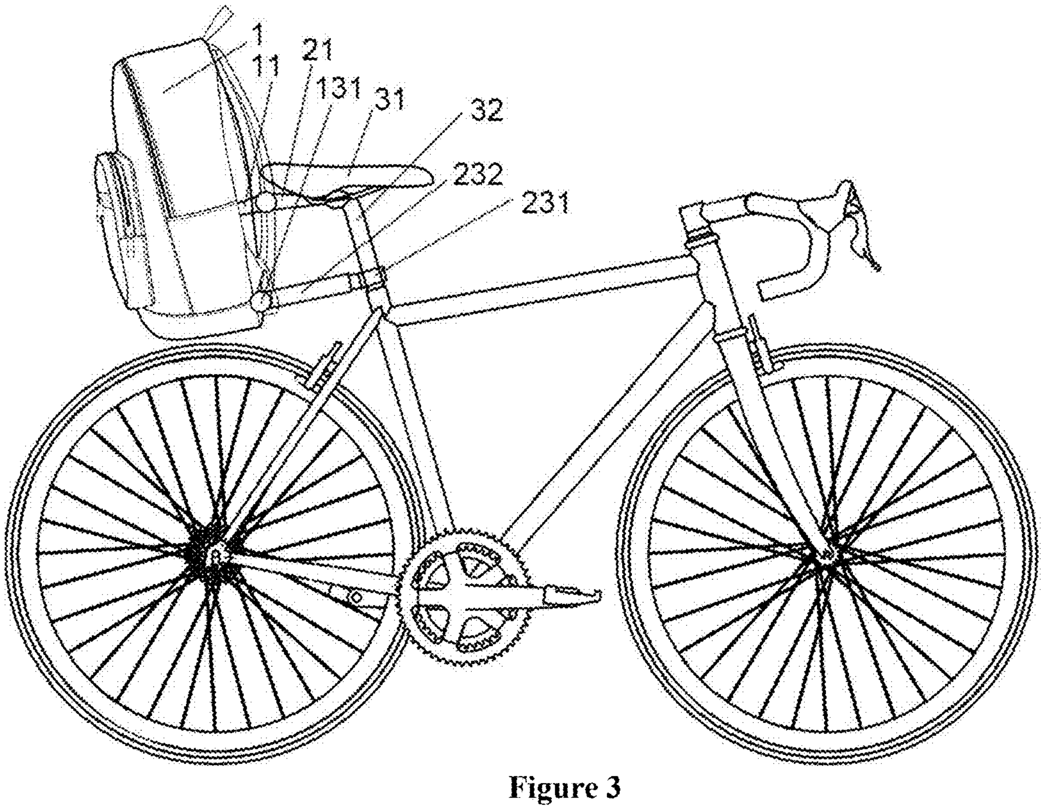
FIG. 3 is a schematic diagram of the backpack and the bicycle in the connected state provided by Example 2 of this utility model.
Figure 4:
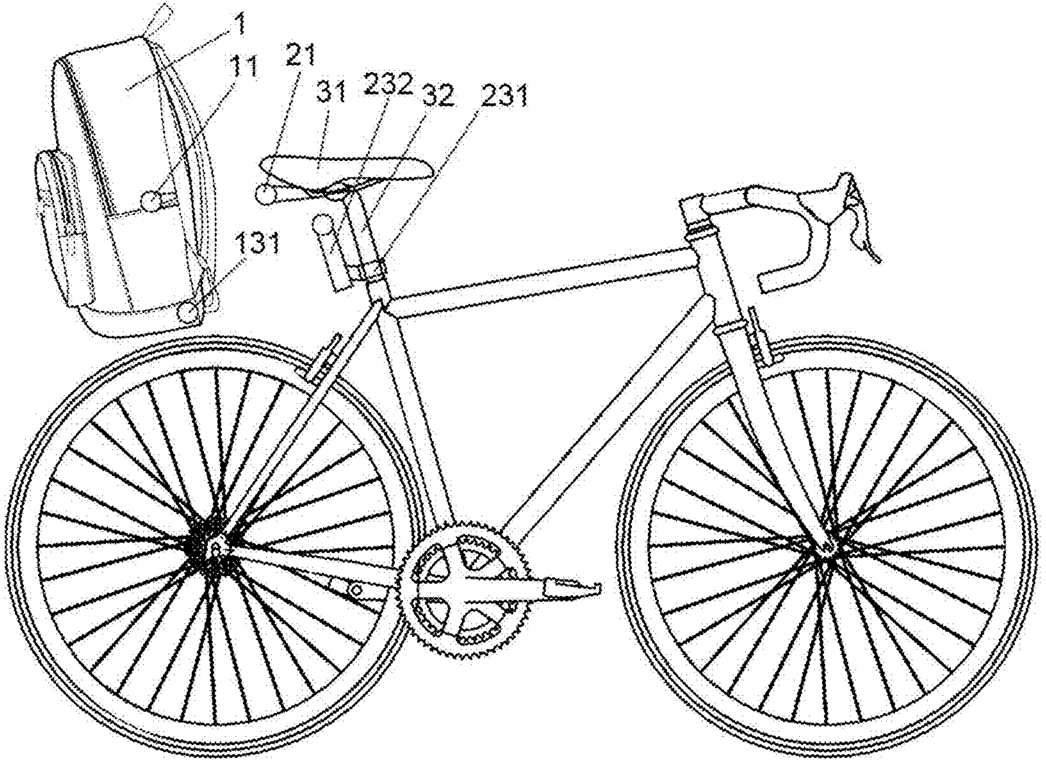
FIG. 4 is a schematic diagram of the backpack and bicycle in the separated state provided by Example 2 of this utility model.

This embodiment provides a backpack, as shown in FIGS. 3 to 4, which is generally similar to the backpack provided in Example 1. The difference lies in:

In this embodiment, sleeve 131 is fixed inside mounting slot 141. One end of support rod 232 is hinged with clamping hoop 231, and support rod 232 can rotate in the range of 0-90° relative to seat post 32. Support rod 232 and seat post 32 can be locked at 0° and 90° angles.

In this embodiment, sleeve 131 adopts a fixed design, while support rod 232 adopts a design that can be rotated and folded. With this design, when it is necessary to use the bicycle to carry the backpack, the user can rotate support rod 232 to an angle of 90° relative to seat post 32. At this point, support rod 232 is directly facing sleeve 131, set horizontally in mounting slot 141 of base 14. The backpack can be moved to allow sleeve 131 to socket onto support rod 232, and the connection between them can be locked by a pin. The connections between connecting component A11 and connecting component a21, as well as connecting component B12 and connecting component b22, can serve as fixation and weight-bearing for the backpack. After reaching the cycling destination, the connections between connecting component A11 and connecting component a21, connecting component B12 and connecting component b22, and connecting component C13 and connecting component c23 are released. Then, support rod 232 is rotated to reset to an angle of 0 relative to seat post 32, reducing the presence of support rod 232, and the backpack can be carried on shoulder.

In conclusion, the above-described embodiments are only used to illustrate the technical solutions of the present utility model, not to limit them. Although the embodiments have been described in detail with reference to the foregoing embodiments, those skilled in the art should understand that various modifications or substitutions can be made to the technical features described in the foregoing embodiments. These modifications or substitutions do not depart from the spirit and scope of the technical solutions of the present utility model, and should be encompassed by the claims and the description.

What is claimed is:

1. A backpack and a seat post of a bicycle, comprising:

a) a backpack body;

b) connecting component A positioned on a left side of the backpack body and detachably connected to component a on the left side of a bicycle seat;

c) connecting component B positioned on a right side of the backpack body and detachably connected to component b on the right side of the bicycle seat;

d) connecting component C positioned at a bottom of the backpack body, and detachably connected to component c on the seat post;

e) a base fixed at the bottom of the backpack body, with a mounting slot that is opened on the base, with one end facing the bicycle seat post open, and utilized for accommodating connecting component C, and connections between the connecting component A and component a, the connecting component B and component b, and the connecting component C and component c collectively form a support structure of the backpack body, while the connection between the connecting component C and the component c creates spacing between the backpack body and the bicycle seat post.

2. The backpack and a seat post of a bicycle as claimed in claim 1, further comprising a specific sleeve as connecting component C, and comprising a support rod and a clamping hoop as component c with below characteristics:

a) the clamping hoop tightens around the seat post;

b) one end of the support rod is connected to the clamping hoop;

c) the support rod matches the specific sleeve and can be inserted directly into the specific sleeve and locked by a pin.

3. The backpack and a seat post of a bicycle as claimed in claim 2, further comprising a pivot shaft, designated as pivot shaft X in this document, near the seat post inside the mounting slot, with one end of the specific sleeve rotatably fixed on, and a limiting cam protrusion set at a far end away from the bicycle seat post inside the mounting slot, making below operation possible:

a) when an angle between the specific sleeve and the mounting slot is 0°, the limiting cam protrusion is used to limit the specific sleeve;

b) and when the angle between the specific sleeve and the mounting slot is 180°, at least ⅓ of a length of the specific sleeve remains inside the mounting slot.

4. The backpack and a seat post of a bicycle as claimed in claim 2, wherein the specific sleeve is fixed in the mounting slot, and the clamping hoop is hinged to one end of the support rod which can rotate relative to the seat post in a range of 0-90°, and can be locked at 0° and 90° relative to the seat post.

5. The backpack and a seat post of a bicycle as claimed in claim 1, wherein the connections between the connecting component A and the component a, and the connecting component B and the component b, can use snap-on, hook-on, or strap connections.

6. The backpack and a seat post of a bicycle as claimed in claim 5, wherein the connections between the connecting component A and the component a, and the connecting component B and the component b, use snap-on connections with below characteristics:

a) the connecting component A, the connecting component B, the component a, and the component b all include adjustable straps and buckles;

b) the length of the adjustable straps can be adjusted, one end of the adjustable straps of the connecting component A and the connecting component B is connected with the buckles, and an other end is connected to the backpack body;

c) one end of the adjustable straps of the component a and the component b is connected with the buckles, and the other end of the adjustable straps is connected to the bicycle seat;

d) the buckles of the connecting component A and the connecting component b are male, and the buckles of the component a and the component B are female, making the buckles of component a and component b can be docked and fastened.

7. The backpack and a seat post of a bicycle as claimed in claim 1, wherein the connecting component C achieves a function of being exposed/concealed through two manners: extension/retraction design or rotatable design.

8. A backpack connection assembly and a seat post of a bicycle, wherein the backpack assembly includes the backpack according to claim 1 and further includes a connector a for connecting to the left side of the bicycle seat, and a connector b for connecting to the right side of the bicycle seat, and the connecting piece c for connecting to the bicycle seat post.

* * * * *